N. F. GARBO.
RECORDING SHEET.
APPLICATION FILED APR. 8, 1913.

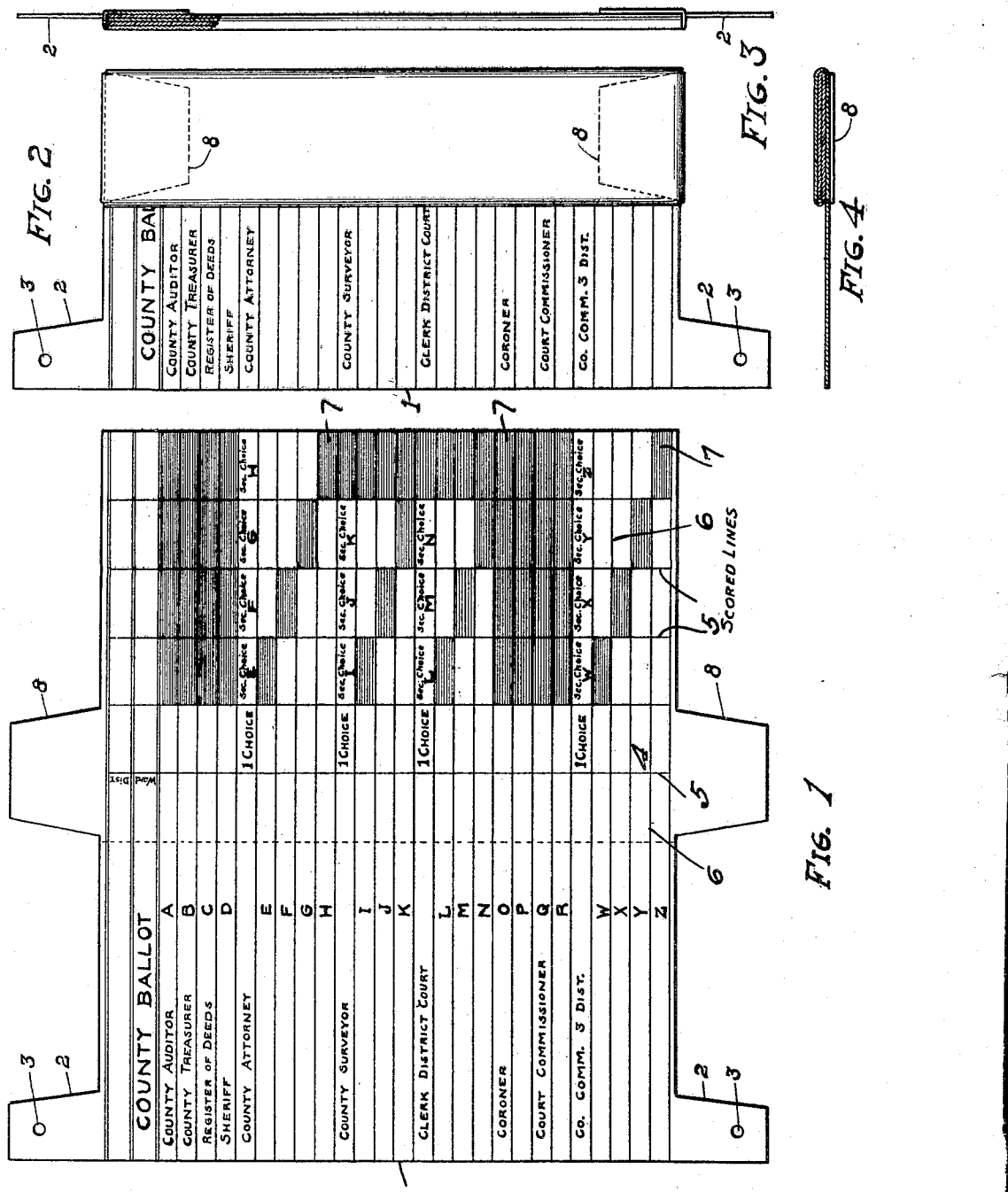
N. F. GARBO.
RECORDING SHEET.
APPLICATION FILED APR. 8, 1913.
1,205,730.
Patented Nov. 21, 1916.
5 SHEETS—SHEET 1.
WITNESSES
INVENTOR
NILS F. GARBO
BY
Paul & Paul
ATTORNEYS

Figures 5, 7:
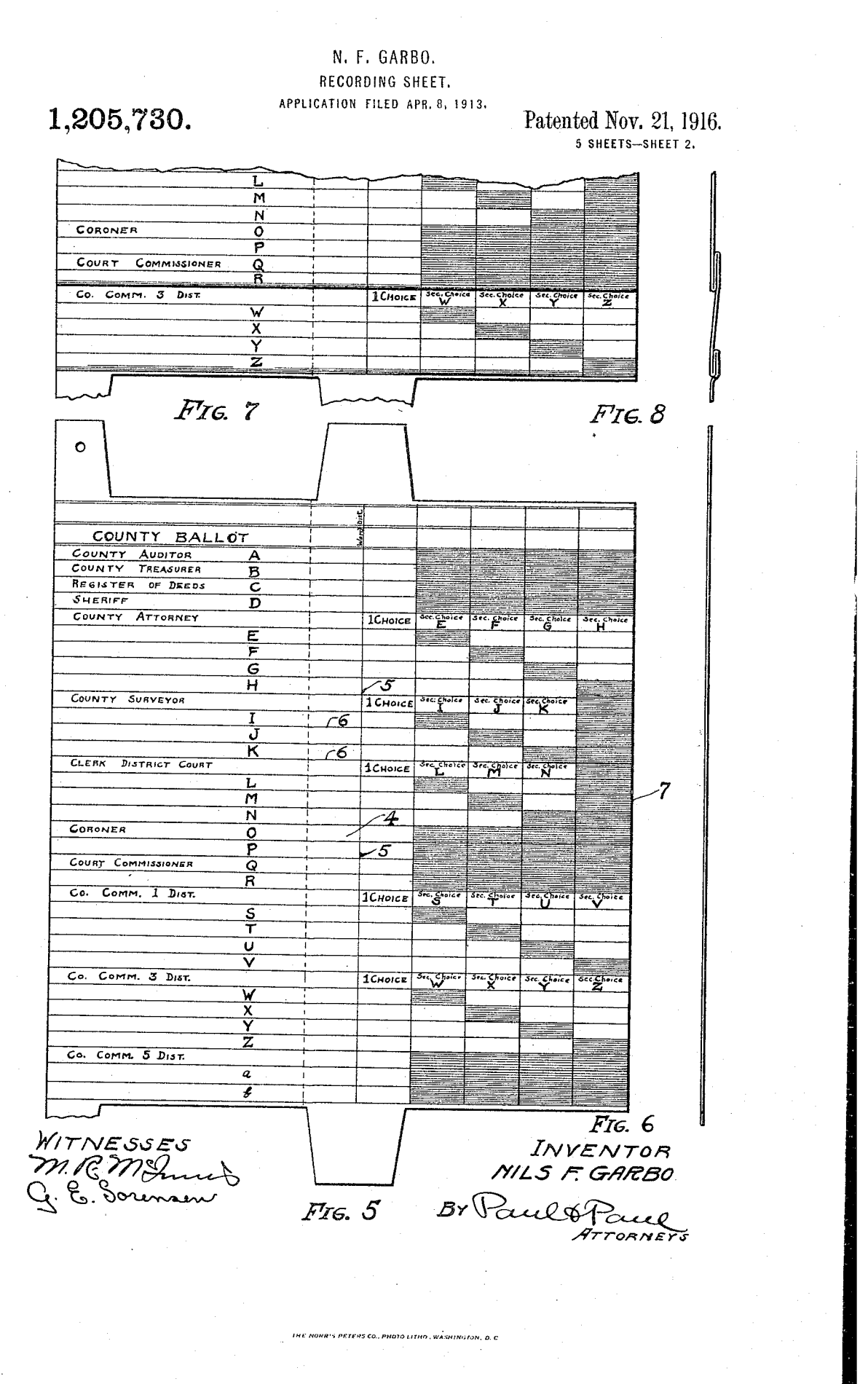

1,205,730.

Patented Nov. 21, 1916.
5 SHEETS—SHEET 2.

*Fig. 7*  *Fig. 8*

*Fig. 5*  *Fig. 6*

INVENTOR
NILS F. GARBO
BY Paul & Paul
ATTORNEYS

WITNESSES

N. F. GARBO.
RECORDING SHEET.
APPLICATION FILED APR. 8, 1913.

1,205,730.

Patented Nov. 21, 1916.
5 SHEETS—SHEET 3.

Fig. 9.
Fig. 10.
Fig. 11.

WITNESSES
M. R. McInnis
G. E. Sorensen

INVENTOR
NILS F. GARBO
BY Paul & Paul
ATTORNEYS.

N. F. GARBO.
RECORDING SHEET.
APPLICATION FILED APR. 8, 1913.

1,205,730.

Patented Nov. 21, 1916.
5 SHEETS—SHEET 4.

FIG. 12

FIG. 13

WITNESSES.
M. C. McInnd
G. E. Sorensen

INVENTOR
NILS F. GARBO
BY Paul & Paul
ATTORNEYS.

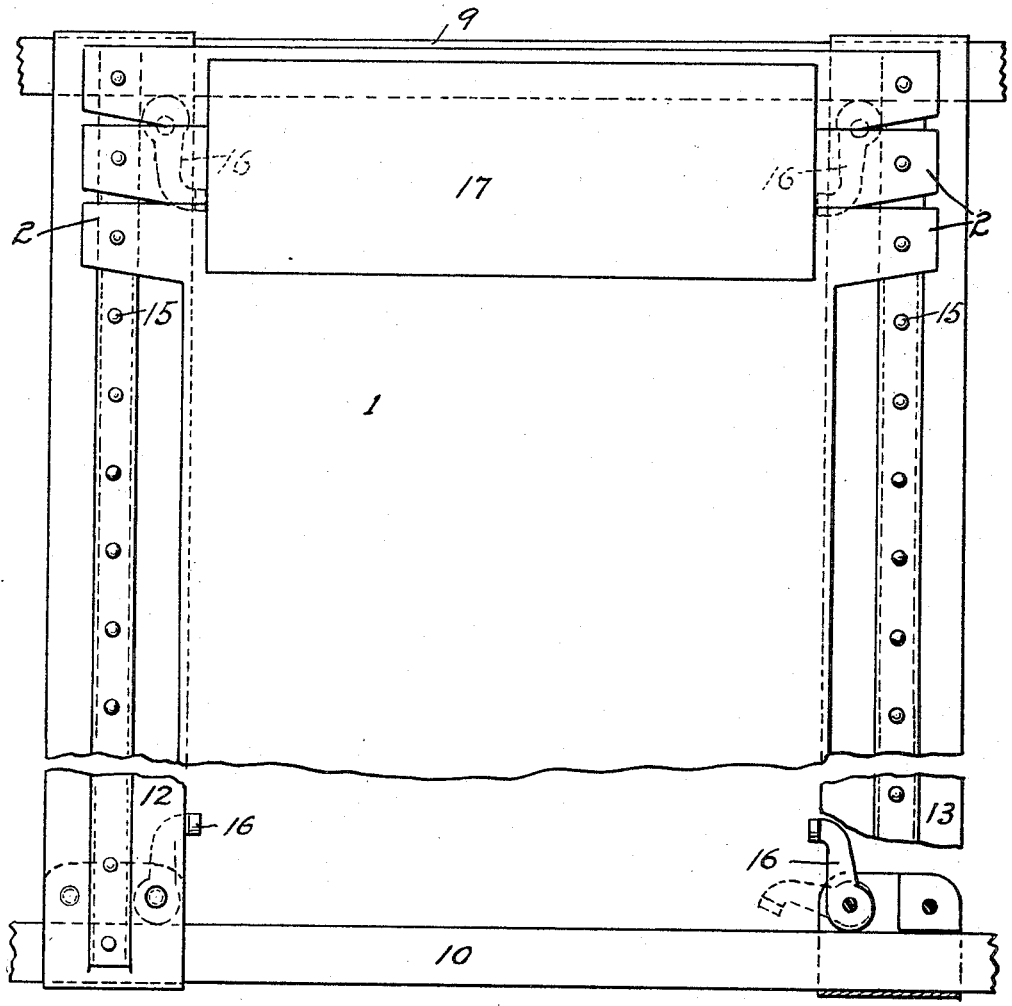
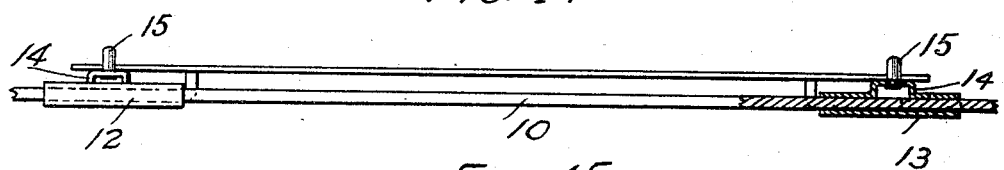

UNITED STATES PATENT OFFICE.

NILS F. GARBO, OF MINNEAPOLIS, MINNESOTA, ASSIGNOR TO COUNTING MACHINE MANUFACTURING CO., OF MINNEAPOLIS, MINNESOTA, A CORPORATION.

RECORDING-SHEET.

1,205,730.  Specification of Letters Patent.  Patented Nov. 21, 1916.

Application filed April 8, 1913. Serial No. 759,770.

*To all whom it may concern:*

Be it known that I, NILS F. GARBO, a citizen of the United States, resident of Minneapolis, Hennepin county, State of Minnesota, have invented certain new and useful Improvements in Recording-Sheets, of which the following is a specification.

This invention relates to improvements in recording sheets designed especially to be used as ballots in primary or general elections, but adapted also for use in recording and tabulating mercantile and other transactions where it is desired to make a permanent record of a large number of like entries.

The object of the invention is to provide a recording sheet upon which entries may be made, such as those indicating the choice of a voter, at an election, for one or more of a number of candidates for office, and which sheets may, after the entries have been made, be brought together and permanently fastened with the entries exposed and in position to be quickly and accurately counted and tabulated.

Another object of the invention is to provide a recording sheet, which, when used as a ballot, may be employed for entering both first and second choice votes, and which sheets when grouped and secured together, will provide ready means, first for counting the first choice votes, and then for counting the second choice votes of each candidate for whom such votes are given, one after the other, until all such second choice votes are counted.

Another object of the invention is to provide a recording sheet, which, when used as a ballot, may be sealed by the voter so as to conceal the entries made by him, thereby insuring a secret vote.

Other objects of the invention will appear from the following detailed description of the invention.

The invention consists generally in the constructions and combinations hereinafter described and particularly pointed out in the claims.

In the accompanying drawings forming part of this specification, Figure 1 is a plan view of a recording sheet embodying my invention in the form designed for use as a ballot, Fig. 2 is a view of the same recording sheet or ballot, folded and sealed as may be done by the voter after he has made entries thereon to indicate his vote. Fig. 3 is a side elevation partly broken away of the folded ballot shown in Fig. 2, Fig. 4 is a transverse section of the folded ballot, shown in Figs. 2 and 3, Fig. 5 is a plan view of a tally sheet showing the same arranged for taking the total of the votes in a county or other political division embracing a number of election districts in which different candidates for office are to be voted for, and in which the residents of one district vote for the candidates of their district only. Fig. 6 is an edge view of the ballot or recording sheet shown in Fig. 5. Fig. 7 is a partial plan view of the tally sheet shown in Fig. 5, when folded transversely for use in a given election district. Fig. 8 is an edge view of the tally sheet shown in Fig. 7, illustrating the manner of folding the same. Fig. 9 is a plan view showing a series of the recording sheets or ballots, grouped and secured together with the ballots folded in position for tabulating the first choice votes and with a blank ballot or tally sheet secured in position for having entered thereon the total of the first choice entries or votes. Fig. 10 is a transverse section of the group of ballots shown in Fig. 9, showing the manner in which the ballots are folded when the first choice votes are to be tabulated. Fig. 11 is an edge view of the group of recording sheets or ballots shown in Fig. 9. Fig. 12 is a plan view of the group of recording sheets or ballots shown in Fig. 9, with the ballots folded into position for tabulating the second choice votes or the votes for the candidates whose names come first in order on the recording sheet or ballot. Fig. 13 is an edge or end elevation of the group of recording sheets or ballots folded into the position shown in Fig. 12. Fig. 14 is a plan view of the filing or assembling frame illustrating the manner of assembling the ballots thereon and securing them together. Fig. 15 is an end elevation partly broken away of the assembling frame shown in Fig. 14.

I will first describe the recording sheet embodying my invention as it is arranged for use as an election ballot, and will also describe the manner of sealing the ballot when the sealing means is employed, and the manner of grouping the ballots and of tabulating the first choice votes and then tabulating separately the second choice votes for each candidate in the order in which the candidates' names are printed on the ballot, it being understood, however, that the invention is not limited in the use of the recording sheets as a ballot, but that the sheet may be employed in any kind of mercantile business or in any system of accounting where entries relating to like transactions are to be entered upon separate sheets, and the totals of such entries are thereafter to be added together and placed upon a single sheet.

The recording sheet 1 is preferably formed in each instance of paper or other suitable material and preferably of substantially rectangular form, having any desired size and preferably divided by horizontal lines into any desired number of horizontal spaces. It is preferably provided at or near the left hand edge of the sheet with the oppositely extending projections 2, each of which is preferably provided with a suitable perforation 3. When the recording sheet is used as a ballot the left-hand portion thereof has printed above it preferably a designation of the political division represented by the ballot. It may be a State ballot, a county ballot, or a municipal ballot, or two or more of these combined. Below the ballot designation are the designations of the offices to be filled and the names of the candidates to be voted for, for each office. I have indicated in the accompanying drawings a county ballot with the names of the county offices or a portion thereof at the left-hand portion of the sheet. Below or opposite these designations the names of the candidates for each office will be printed, and the ballot will, of course, have below the designation of each office the names of all the candidates for that particular office.

At the right-hand portion of the sheet are vertical lines which, with the horizontal lines on the sheet, provide opposite each name one or more rectangular spaces, depending upon whether the sheet is to be used as a ballot for an election in which the voters may enter a first choice only, or may enter a first, second or more choices for each office that is to be filled from among the candidates whose names are upon the ballot. When the ballot is to be used in voting at an election in which only a single choice can be entered, a single series 4 of rectangular spaces will be provided at the right-hand edge of the sheet, said spaces being formed by the horizontal ruled lines 6, the right-hand edge of the sheet and the vertical line 5. In this instance the right-hand edge of the sheet will be coincident with the right-hand side of the series of rectangular spaces 4.

Where the sheet is to be used as a ballot at an election in which the voters may enter a second choice as well as a first choice, among the candidates for each office, the sheet is provided at the right-hand of the first choice column spaces 4, with a series of columns of rectangular spaces formed by the extensions of the horizontal ruled lines 6 and additional, vertical, scored lines 5, there being as many of these columns of second choice spaces as there are candidates for any one of the offices to be filled. I have, for example, shown on the ballot represented in Fig. 1 of the drawing, four candidates for the office of county attorney, and four for the office of county commissioner for the third district. I have also included three candidates for the office of county surveyor and three candidates for office of clerk of the district court. Assuming that the election law permits each voter to express a first and second choice for each of these offices, among the candidates whose names are printed upon the ballot, the sheet will be provided with four columns of second choice spaces formed by the vertical scored lines 5, and the horizontal ruled lines 6.

I have indicated upon the sample ballot represented in Fig. 1, only one candidate for each of the offices of county auditor, county treasurer, register of deeds and sheriff, and only two candidates for office of coroner and court commissioner. If there is but a single candidate for any office, the voter will not, of course, be permitted to express a second choice, and the election law may not provide a second choice even where there are only two candidates for the same office. In such instances the second-choice spaces will be practically obliterated by coloring them black or shading them in some manner to indicate to the voter that they are not to be used, as represented at 7 on Sheet 1 of the drawings.

One of the vertical second-choice columns will be assigned to each candidate whose name appears on the ballot for an office for which a second choice vote is permitted, and the name of such candidate will be printed in the vertical column assigned to him above the series of spaces opposite horizontally the names of the candidates for such office. I have indicated this upon the ballot shown in Fig. 1 by placing the letters E, F, G and H on the horizontal lines to represent four candidates for the office of county attorney. The letters I, J and K on the horizontal lines to represent three candidates for the office of county surveyor. The letters L, M and N on the horizontal lines to represent three candidates for office of clerk of district court. The letters W, X, Y and Z on the horizontal lines to represent four candidates for the office of county commissioner for the third district.

The first name in the group of candidates for each office in which a second choice is permitted will be printed in the first, second-choice column opposite the designation of the office; the second name in the second column and so on. I have indicated this upon the ballot represented in Fig. 1, by placing the letters E, F, G and H in the second choice columns opposite the designation "County attorney." The letters I, J and K in the first three second-choice columns opposite the name "County surveyor." The letters L, M and N in the first three second-choice columns opposite the designation "Clerk district court." The letters S, T, U and V in the four second-choice columns opposite the designation "County commissioner first district," and the letters W, X, Y and Z in the four columns opposite the designation "County commissioner third district." If there are more second-choice columns than there are candidates for any one office the extra spaces will be obliterated by shading as indicated at 7 in Fig. 5 of the drawings.

In order that ignorant or careless voters may not make the mistake of entering both their first and second choice votes for the same candidate, I prefer to obliterate by shading the second-choice space opposite the name of each candidate on the horizontal line, which comes under the same name in the vertical column. The voters will readily understand that they are not to enter the mark designating their vote on these shaded or black spaces and hence will not make the mistake of casting their first and second choice ballots for the same candidate.

I prefer to provide a tally sheet upon which may be entered the sum of the votes for each candidate on any particular bundle or group of ballots that have been secured together. This tally sheet will have the names of the candidates for all of the election districts entered thereon. I have illustrated such a tally sheet in Figs. 5, 6, 7 and 8 of the drawings. In Fig. 5 the tally sheet is shown lying flat with all of the names exposed. It will be noted that it has the names of candidates represented by the letters S, T, U and V under the heading, "County commissioner first district." Names represented by the letters W, X, Y and Z, are shown under the heading "County commissioner third district," and names represented by the letters $a$, $b$ for "County commissioner fifth district." When it is desired to use this tally sheet for taking off the totals from a group of ballots the tally sheet is folded on horizontal lines as represented in Figs. 7 and 8 of the drawings, so as to leave exposed only the names of candidates in the particular election district or division to be counted. For instance I have shown in Figs. 7 and 8 of the drawings the tally sheet folded so as to permit counting the ballots for "County commissioner third district."

The same arrangement may be embodied in the tally sheets for any other district where like conditions are found.

In order that each voter may seal his ballot after marking the same to indicate his vote, I prefer to provide the upwardly and downwardly extending projections 8, which are preferably provided with gummed surfaces and which after the ballot is folded as indicated in Figs. 2, 3 and 4 of the drawings, may be folded over and pasted against the back of the sheet as shown clearly in said Figs. 2, 3 and 4. The voter having folded and sealed his ballot in this manner will then hand the same to the election judges and the ballots may then be dropped into a closed ballot box or they may be placed directly upon a filing or grouping frame hereinafter described. If the ballots are placed in the ballot box they will, before counting, be removed therefrom and placed upon said filing or grouping frame.

The filing or grouping frame that I prefer to use is shown in Figs. 14 and 15 of the drawings. It consists of two transverse bars 9 and 10 upon which are placed the longitudinal bars 12 and 13, each of which is preferably provided with a rib 14 having a spaced series of pins 15. The bars 12 and 13 are capable of sliding toward and from each other on the bars 9 and 10, and said bars may be locked in any desired position by means of the cam-faced locking levers 16. When it is desired to file or group the recording sheets or ballots the bars 12 and 13 of the filing frame are adjusted, so that the distance between the pins on one bar and the pins on the other bar exactly equals the distance between the perforations 3 in the oppositely extending projections 2 of any recording sheet. It will be understood that the ballots for any one election district, for instance the State ballots, are all of the same length and in fact all of said sheets should be exactly alike.

The election judges being ready to assemble the ballots and having adjusted the filing frame to the proper width, they will place upon the first set of pins a blank ballot, the face of the ballot being down. They will then place one of the ballots that has been used by a voter upon the second set of pins and so on until the filing frame is filled, with the exception of the last pair of pins. The ballots are preferably unsealed before being placed upon the filing frame and a blank ballot is placed upon the last pair of pins. A backing sheet 17 is then pasted over the backs of all the ballots on the frame, thus permanently securing them in position by leaving each ballot free with the exception of a portion near the left-hand edge substantially equal in width to the width of the filing projections 2. (See Figs. 10 and 13 of the drawings). The group of ballots placed on the frame are then removed and are in position for quick counting and for permanent preservation. This method of spacing and securing together a group of the ballots causes said ballots to be permanently arranged and secured in an underlapping relation. That is to say, if a group of the ballots, after being so secured, is removed from the filing frame and turned over so as to lie face uppermost the first ballot, which for convenience will usually be a blank ballot, is fully exposed, while each of the succeeding ballots lies under the preceding ballot of the group and projects only the width of a vote receiving column beyond the right-hand edge of said preceding ballot. The relation of the ballots to one another may be considered as either "underlapping" or "overlapping," as each ballot underlaps the preceding ballot of the group and lies over or overlaps the succeeding ballot. I have, however, for convenience referred to this arrangement in the claims as an "underlapping" relation.

If the expression of a second choice is not permitted at the election, each ballot will, as before stated, have only one vertical column of spaces, this being the first or single-choice column. In this case it will not be necessary to place a blank ballot on the first set of pins on the frame, but the first voted ballot may be placed upon said first set of pins. The vertical columns on all of the ballots are all preferably of the same width and of the same width as the filing projections 2. Hence when the ballots are assembled by placing them upon the filing frame, each ballot projects at the right a distance equal to the width of one column beyond the right-hand edge of the ballot above it. The last ballot put on the frame being a blank one the column of said ballot that is exposed will be blank and will be adapted to receive the totals of the entries on the used ballots. If the ballots are provided with only the first choice columns then it will be only necessary for the election judges to count the numbers of marks or entries on the exposed columns opposite each name, and place the totals on the exposed column of the last or blank ballot. If, however, second choice voting is permitted each of the ballots will be provided with second-choice columns, and before counting the first choice votes the judges will fold the ballots on the scored lines at the right-hand of the first-choice column, as indicated in Figs. 9, 10 and 11 of the drawings. None of the second-choice columns of the voted ballots will be visible, the second-choice columns appearing in Fig. 9 being those on the blank ballot that was last put on to the filing frame. Having entered the total of first choice votes in the first-choice column of the blank ballot, the judges will proceed to turn out the under folded portions of the voted ballots so as to expose the first, second-choice column of each ballot in the group. The spaces then exposed will be those only which may contain second-choice marks or entries for the first name in each group in which second-choice voting is permitted. The totals of these second-choice votes will be entered in the first, second-choice column on the blank ballot last placed on the filing frame and which will now be at the back of the group of ballots. This operation is repeated for each second-choice column in order until the totals of all the second-choice votes have been entered on the blank ballot last added to the file.

I find it convenient to file up to fifty ballots in a group, and as ordinary city voting precincts are usually arranged so that from four to six hundred votes are cast in each precinct, there will be for the large precincts ten or more of such groups of ballots. After the totals for each group of ballots have been entered upon the last sheet or blank ballot on the group these totals may be added and entered on an auditor's or tally sheet such as shown in Fig. 5 of the drawings. A convenient way for doing this will be to cut from each of the groups of ballots that have been pasted together all of the projections with the exception of those on the last ballot and the blank ballot containing the totals of the votes for each candidate in said group. The official return sheet or tally sheet for the county auditor has also the same projections and filing holes as the ballot, and this return sheet is placed on the first pair of pins. The footed groups of ballots are then filed on top of each other but on separate sets of pegs. This will cause the column on each blank ballot containing the totals for a group of ballots to be exposed beyond the corresponding column of the group preceding it, and the totals for all of the groups of ballots will be shown in position to be quickly added and entered on the tally sheet, which then becomes the official return sheet.

If the votes that have been cast include both first and second choice votes so that the blank ballot at the back of each group of ballots has first and second choice columns, it will be necessary for the judges before entering the totals on the return sheets, in the manner above specified, to fold all of the ballots first so as to expose only the first choice column and then to add the total of this column and enter the same in the appropriate column on the return sheet. After this is done the tally sheets at the bottom of each group of ballots are again folded so as to expose the first second-choice column on each tally sheet, and the totals from such columns are added and entered on the total recapitulation sheet, and this operation is repeated until the total on all the columns of the blank ballots attached to the different groups of ballots have been entered on the recapitulation sheet. The recapitulation sheet will now give the perfect results of all ballots cast and these figures are now copied on the return sheet and turned over to the county auditor with the pasted group of original ballots.

The return sheets that are sent to the county auditor's office are, it will be seen, practically identical with the recording sheets that are used as ballots, and, when received, in order to secure the results of the election, the return sheets from any ward or from any country district may be sorted either by number or in alphabetical order. A filing frame similar to that already described is used upon which the tally sheets are filed with the faces down, and with a blank sheet on top of the group and a moistened sheet of gummed paper is secured on the backs of these reports. When the group of sheets is removed from the file the figures for each candidate will appear in the same columns for each ward or district and the numbers may be added together and entered on the blank sheet at the bottom of the group. The footing sheet may be removed and the total result for a county may be obtained by filing and grouping these sheets in the manner stated above.

While I have described the invention as particularly applicable for use in elections, it will be understood that the invention is not limited to recording sheets used for such purposes. It will also be understood that the details of the construction and arrangement may be varied in many particulars without departing from my invention.

I do not in this application claim the vote filing rack or frame shown and described herein, nor its combination with the recording sheet, but I reserve the right to claim the same in a separate application to be filed as a division hereof. Nor do I, in this application, claim those features of the auditor's or tally sheet illustrated in Figs. 5, 6, 7 and 8 of the drawings which are not found also in the sheet illustrated in Figs. 1, 2, 3 and 4 of the drawings.

I claim as my invention:

1. A vote recording sheet, having upon its face the designations of offices to be filled and names of candidates for each office, one or more columns on the face of said sheet and at one side thereof for the reception of vote indicating marks opposite said names, and means, forming a part of said sheet, to enable a series of like sheets of the same size to be spaced or assembled in underlapping relation to one another, with the edge of each overlying sheet coinciding with the inner edge of a vote receiving column of the next underlying sheet, substantially as described.

2. A recording sheet having upon its face names pertaining to transactions in respect to which entries are to be made, one or more columns on the face of said sheet and at one side thereof for the reception of indicating marks opposite said names, and means, forming a part of said sheet, to enable a series of like sheets of the same size to be spaced or assembled in underlapping relation to one another, with the edge of each overlying sheet coinciding with the inner edge of a mark receiving column of the next underlying sheet, substantially as described.

3. A vote recording sheet having upon its face the designations of offices to be filled and names of candidates for each office, a plurality of columns on the face of said sheet and at one side thereof for the reception of vote indicating marks opposite said names, and means, forming a part of said sheet, to enable a series of like sheets of the same size to be spaced or assembled in underlapping relation to one another with the edge of each overlying sheet coinciding with the inner edge of a vote receiving column of the next underlying sheet, substantially as described.

4. A vote recording sheet having upon its face the designations of offices to be filled and names of candidates for each office, a plurality of spaced columns upon the face of said sheet at one side of said names for the reception of vote indicating marks, said columns being separated by scored lines, and means, forming a part of said sheet, to enable a series of like sheets of the same size to be spaced or assembled in underlapping relation to one another, with the outer edge of any vote receiving column substantially coinciding with the inner edge of a corresponding vote receiving column of the next underlying sheet, substantially as described.

5. A vote recording sheet having upon its face the designations of offices to be filled and names of candidates for each office, a plurality of spaced columns upon the face of said sheet and at one side thereof for the reception of indicating marks opposite said names, said columns being separated by scored lines extending from the top to the bottom of the sheet and parallel to one another, facilitating the folding of said sheets on said scored lines, and means, forming a part of said sheet, to enable a series of said sheets to be spaced or assembled in underlapping relation to one another with the outer edge of any vote receiving column substantially coinciding with the inner edge of a corresponding vote receiving column of the next underlying sheet, substantially as described.

6. A plurality of vote recording sheets, ruled and spaced alike and each having upon its face the designations of offices to be filled and names of candidates for each office, one or more columns on the face of each vote recording sheet and at one side thereof provided with spaces arranged opposite said names for receiving vote indicating marks, and means securing said vote recording sheets together in underlying relation with the edge of each overlying sheet coinciding with the inner edge of a vertical column of vote receiving spaces of the next underlying ballot.

7. A plurality of vote recording sheets, each having upon its face the designations of offices to be filled and the names of candidates for each office, a plurality of columns on the face of each sheet and at one side thereof provided with spaces arranged opposite said names for receiving vote indicating marks, the first column being separated from the body of the vote recording sheet by a vertical scored line, and the succeeding columns being separated from one another by similar scored lines, said scored lines facilitating the folding of said sheet at the edges of said column, and means securing said vote recording sheets together in underlying relation with the outer edge of each column of an overlying sheet coinciding with the inner edge of the corresponding column of the next underlying sheet, substantially as described.

8. A ballot having upon its face names of persons to be voted for, one or more columns on the face of said sheet and at one side thereof, provided with spaces arranged opposite said names for receiving vote indicating marks, the first column being separated from the body of the ballot by a scored line extending from the top to the bottom of the sheet and parallel to the edge thereof, and the succeeding columns being separated from one another by similar scored lines, said scored lines facilitating the folding of said sheets at the edges of the columns, and means, forming a part of said ballot, to enable a series of said ballots to be spaced or assembled in underlapping relation to one another with the edge of each overlying ballot coinciding with the inner edge of a vote receiving column of the next underlying ballot, and, when the ballots are correspondingly folded on the scored lines, with the outer edge of each column of an overlying ballot coinciding with the inner edge of the corresponding column of the next underlying ballot, substantially as described.

9. A ballot having upon its face names of persons to be voted for, with a column on the face of said ballot and at one side thereof provided with spaces arranged opposite said names for receiving vote indicating marks, and means, forming a part of said ballot, to enable a series of like ballots to be spaced or assembled in underlapping relation to one another with the edge of each overlying ballot coinciding with the inner edge of the vote receiving column of the next underlying ballot, substantially as described.

10. A ballot having upon its face names of persons to be voted for, with a column on the face of said ballot and at one side thereof provided with spaces arranged opposite said names for receiving vote indicating marks, said column being separated from the body of the ballot by a scored line extending from the top to the bottom of the ballot and parallel to the edge thereof and facilitating the folding of said ballot on said scored line, and, means forming a part of said ballot, to enable a series of said ballots to be spaced or assembled in underlapping relation to one another with the edge of each overlying ballot coinciding with the inner edge of the vote receiving column of the next underlying ballot.

11. A vote recording sheet, having upon its face the designations of offices to be filled and names of candidates for each office, a series of spaced columns upon the face of said sheet at one side of said names for the reception of vote indicating marks, said columns being separated by scored lines, the first column being marked for the reception of first choice votes, and the succeeding columns being marked for the reception of second choice votes, substantially as described.

12. A vote recording sheet, having upon its face the designations of offices to be filled and names of candidates for each office, a series of spaced columns upon the face of said sheet at one side of said names for the reception of vote indicating marks, said columns being separated by scored lines, the first column being marked for the reception of first choice votes, and the succeeding columns being marked for the reception of second choice votes, each second choice column bearing the name of one of the candidates, where there are a plurality of candidates for the same office, substantially as described.

13. A vote recording sheet, having upon its face the designations of offices to be filled and names of candidates for each office, a series of spaced columns upon the face of said sheet at one side of said names for the reception of vote indicating marks, said columns being separated by scored lines, the first column being marked for the reception of first choice votes, and the succeeding columns being marked for the reception of second choice votes, each second choice column bearing the name of one of the candidates, where there are a plurality of candidates for the same office, and each space that comes opposite the same name, both horizontally and vertically, being distinctively designated to indicate to the voter that voting marks are not to be placed thereon.

14. A vote recording sheet, having upon its face designations of offices to be filled and names of candidates for each office, a series of spaced columns upon the face of said sheet at one side of said names for the reception of vote indicating marks, said columns being separated by scored lines, one column being marked for the reception of first choice votes, and the other columns being marked for the reception of second choice votes, said sheet being capable of folding on any one of its scored lines, whereby the columns on each sheet may be successively exposed for counting, first, all the first choice votes, and, second, the second choice votes for each candidate, with all marks indicating second choice votes, except those for a single candidate for each office, being concealed while the second choice votes are being counted, substantially as described.

In witness whereof, I have hereunto set my hand this 5th day of April, 1913.

NILS F. GARBO.

Witnesses:
M. R. McINNIS,
EDWARD A. PAUL.

Copies of this patent may be obtained for five cents each, by addressing the "Commissioner of Patents, Washington, D. C."